United States Patent [19]
Carter et al.

[11] Patent Number: 5,484,079
[45] Date of Patent: Jan. 16, 1996

[54] HYDROPNEUMATIC FILAMENT-WOUND PRESSURE VESSEL

[75] Inventors: Thomas G. Carter, Kent; Douglas M. Horner, Gates Mills; Robert L. Zimmerman, Cleveland; Robert J. Pristas; James C. Murphy, both of Chardon, all of Ohio

[73] Assignee: Essef Corporation, Chardon, Ohio

[21] Appl. No.: 402,920

[22] Filed: Mar. 13, 1995

[51] Int. Cl.$^6$ ............................................. F16L 55/04
[52] U.S. Cl. ....................... 220/589; 220/4.24; 138/30
[58] Field of Search ................................. 220/586, 589, 220/530, 4.24, 4.25; 138/30

[56] References Cited

U.S. PATENT DOCUMENTS

| | | | |
|---|---|---|---|
| 2,394,401 | 2/1946 | Overbeke | 220/4.25 X |
| 4,234,016 | 11/1980 | Horino | 138/30 |
| 4,474,215 | 10/1984 | Richter et al. | 138/30 |
| 4,595,037 | 6/1986 | LeBreton et al. | |
| 5,441,584 | 8/1995 | Mathieu | 220/589 X |

*Primary Examiner*—Steven M. Pollard
*Attorney, Agent, or Firm*—Pearne, Gordon, McCoy & Granger

[57] ABSTRACT

A hydropneumatic filament-wound pressure vessel is disclosed. The vessel has first and second cup-shaped tank liners having circular open mouths which are provided with a seal and diaphragm assembly. The seal assembly includes a pocket formed by an inner wall and shelf associated with the first liner and a ledge associated with the second liner. The shelf, ledge and cylindrical wall cooperate with an inner surface of the second liner to provide an O-ring pocket. An O-ring is provided in the pocket and the O-ring defines the periphery of a flexible diaphragm which divides the interior of the liners into separate pressure chambers. A continuous filament is wound over the surface of the liners in an isotensoid pattern. Each liner has a geodesic dome surface extending between a diameter of the liner and a polar opening. The dome surface is defined by oppositely curving surfaces of revolution of a meridia joined by an inflection point. The first surface of revolution curves from the liner diameter to a first point just unto but not at said inflection point. The second surface of revolution curves from the polar opening to a second point just unto but not at said inflection point in a direction opposite the curvature of the first surface of revolution. The first and second surfaces are joined, and the inflection point is traversed by a straight line third surface of revolution closely approximating geodesic curvature through the inflection point.

16 Claims, 3 Drawing Sheets

HYDROPNEUMATIC FILAMENT-WOUND PRESSURE VESSEL

BACKGROUND OF THE INVENTION

This invention relates to filament-wound pressure vessels and, more particularly, to a filament-wound hydropneumatic accumulator tank containing a flexible diaphragm which separates the interior of the tank into a compressible gas-containing chamber and a liquid-containing chamber. In water system applications, there exists a need to provide a stored energy device that can provide instantaneous water pressure to some type of demand. To accomplish this, the pressure vessel has become an accepted method of providing this water pressure. The tank is generally connected in line with a supply source that has a pumping device. This pumping device is not capable of providing instantaneous pressure, nor is it recommended that the pumping device operate in a manner that is cycling in unison with the demand for the water. This can reduce the life of the pumping device. A pressure tank acts as a storage device that can supply water under pressure for low demand periods without requiring the pumping device to turn on. For higher demand periods, the tank will allow the pump to run for recommended minimum periods while not interrupting the demand requirements. In order for the tank to act in this manner, air under pressure contained in the tank is compressed as the water is pumped into the tank. As more water enters the tank, a pressure rise results, and the pump will shut off at a predetermined sensed pressure. The cycle will not repeat until a demand relieves the tank pressure to a predetermined low sensed pressure which will turn on the pump to refill the tank.

Most accumulator tanks provide a flexible barrier between the air and water to prevent the loss of air and, therefore, air pressure in the system. The technique in which air and water is separated may be by employing a diaphragm or flexible membrane which is attached to the inner wall of the tank to separate the air from the water. A second technique is to employ an air cell wherein a sealed bladder containing air is positioned in the tank with access to the interior of the bladder by an exterior air valve. A similar arrangement may be used by containing water within the cell which is surrounded by pressurized air.

While all of these designs have advantages and disadvantages, the most desirable arrangement is a design having a diaphragm attached to the inner side wall of the tank to separate the water and air contained therein. Such a tank operates correctly and in any orientation, and the tank and diaphragm arrangement is more conducive to high production manufacturing techniques. Moreover, a diaphragm-type separator may be constructed from a relatively heavy gauge plastic, or desirably, butyl rubber, and may be shaped to conform to the cross-section of the tank to eliminate stretching.

This arrangement, however, involves the dual problem of providing a pressure tight seal between the mating halves of the pressure vessel and between the side wall of the vessel and the diaphragm. For the sake of economy, attempts have been made to combine the seal between the tank halves and the seal between the diaphragm and the side wall in a single assembly. Such an arrangement is shown in U.S. Pat. No. 4,595,037. The arrangement shown in the patent, however, involves the use of an additional machined ring and an additional O-ring seal in the assembly. The use of additional assembly parts naturally increases the cost of the item. More importantly, however, the assembly shown in U.S. Pat. No. 4,595,037 involves the use of two seals to prevent leakage from the tank liner. Further, traditional tank designs include top and bottom domes as well as a cylindrical side wall. The use of a cylindrical side wall portion does not add to the structural integrity of the pressure vessel and, therefore, wastes material in the manufacture of the vessel.

BRIEF DESCRIPTION OF THE INVENTION

This invention provides a fiber-reinforced hydropneumatic pressure vessel which provides a simplified seal and diaphragm combination between the mating halves of cup-shaped tank liners. The cup-shaped tank liners desirably have an isotensoid-shaped surface which provides uniform tensile loading on the filaments which provide the structural integrity of the vessel.

The hydropneumatic filament-wound pressure vessel according to this invention comprises first and second cup-shaped plastic tank liners having circular open end portions. The end portions have first and second end faces which mate in face-to-face apposition so that the cup-shaped plastic tank liners define a continuous outer surface. This surface is an isotensoid surface formed by face-to-face geodesic domes which define an interior pressure chamber. One of the tank liners or domes has an inner axially-extending cylindrical wall spaced radially inwardly from an inner seam line. The cylindrical wall has an annular shelf extending radially outwardly to an inner wall portion of the second tank liner or dome. The inner wall portion of the second tank liner is cylindrical and has an annular ledge extending radially inwardly. An O-ring is positioned between the shelf and the ledge so as to be compressed between the cylindrical wall and the inner wall portion of the second tank liner. The O-ring forms the periphery of an integral flexible diaphragm. The diaphragm extends between an end of the cylindrical wall and an edge of the ledge to separate the pressure chamber into discrete variable volume pressure chambers. A resin-impregnated filament winding covers the outer surface in a predetermined isotensoid winding pattern.

As is more fully set forth in copending application Ser. No. 08/347,693, filed Dec. 1, 1994, the surface of each dome is a geodesic surface providing isotensoid loading of the filament wound thereon. Each dome surface extends between the area at which the domes are in face-to-face apposition or, more precisely, the diameter of the vessel and a polar opening at the polar axis of the dome. Each dome is defined by first and second oppositely curving surfaces of revolution of a meridia joined by an inflection point. The first surface of revolution curves from the diameter to a first point just unto, but not at, said inflection point. The second surface of revolution curves from the polar opening to a second point just unto, but not at, the inflection point in a direction opposite the curvature of the first surface of revolution. The first and second surfaces are joined, and the inflection point is traversed by a straight line third surface of revolution which closely approximates geodesic curvature through the inflection point.

DETAILED DESCRIPTION OF THE INVENTION

Figure 1:
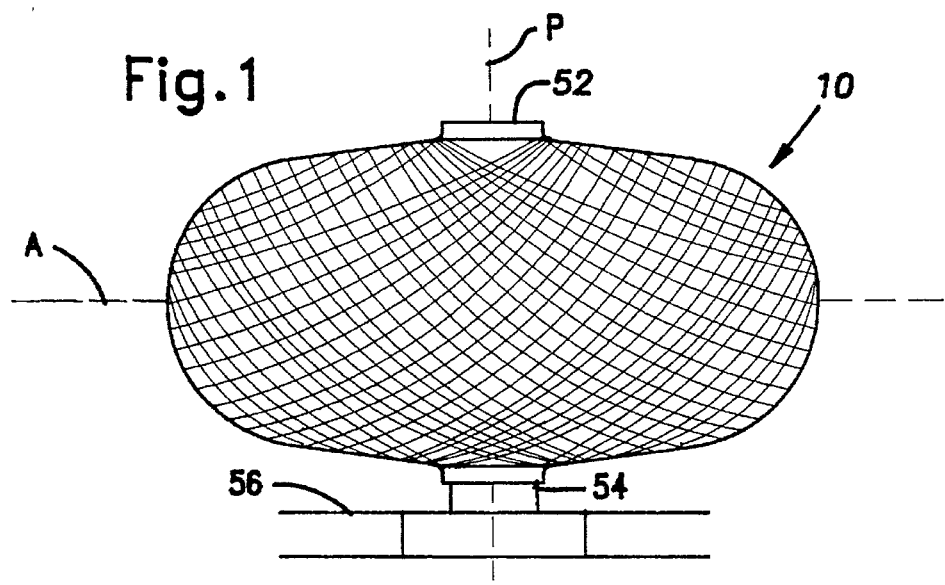
FIG. 1 is an elevational view of a pressure vessel according to this invention.
Figure 2:
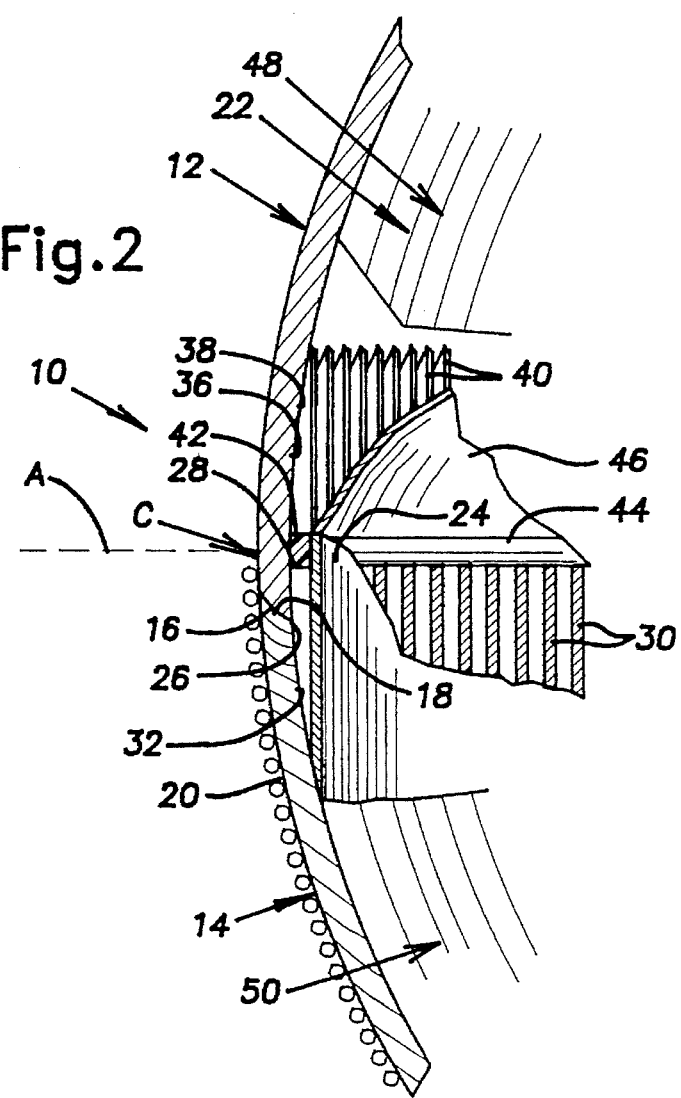
FIG. 2 is an enlarged fragmentary cross-sectional view of the pressure vessel, the plane of the section being indicated by the line 2—2 in FIG. 1.

Referring now to the drawings and, more particularly, to FIGS. 1 and 2, there is illustrated an accumulator vessel or tank 10 which is formed by first and second cup-shaped plastic tank liners 12 and 14. The liners 12 and 14 are preferably injection-molded but may be formed by other molding techniques.

The liners 12 and 14 have circular open mouth end portions having first and second end faces 16 and 18, respectively. The end faces 16 and 18 mate in face-to-face apposition to form an outer surface 20. The outer surface 20 is defined by a curved surface of revolution generated by first and second lines of identically reversed curvature, each extending between a circumference C having a diameter corresponding to a major axis A and a minor or polar axis P of the vessel 10. As will become apparent hereinafter, the curvature of the liners 12 and 14 is preferably geodesic or isotensoid.

The liners 12 and 14 mate in face-to-face apposition to define an inner pressure chamber 22 which is sealed by a sealing joint assembly.

Referring particularly to FIG. 2, the sealing joint assembly includes an inner axially-extending cylindrical wall 24 spaced radially inwardly from an inner seam line 26. The cylindrical wall 24 has an annular shelf 28 formed by the upper surface of a multiplicity of fins 30 which are joined between the wall 24 and an inner wall portion 32 of the liner 14 and which extend from the wall 24 and into abutting engagement with a cylindrical wall portion 36 of the liner 12. The cylindrical wall portion 36 of the liner 12 extends between the inner seam 26 and a circular intersection 38 with the inner surface of the liner 12. A plurality of fins 40 project radially inwardly from the cylindrical inner wall portion 36 to define an annular ledge 42 which opposes the shelf 28.

The shelf 28, the ledge 42, the cylindrical inner wall portion 36, and an upper portion of the wall 24 cooperate to form an O-ring seat which receives an O-ring 44. The O-ring 44 is compressed slightly between the wall 24 and the wall portion 36 to provide a dynamic seal between these members. The O-ring 44 forms the periphery of an integral flexible diaphragm 46 which extends from the O-ring and between an end of the cylindrical wall 24 and an edge of the ledge 42 to separate the chamber 22 into discrete variable volume pressure chambers 48 and 50. The pressure chamber 48 may contain pressurized air, and the chamber 50 may contain water or other liquid. The pressurized air is admitted to the chamber through a one-way check valve (not shown) provided in a fitting 52 (FIG. 1) in the tank. An opposite fitting 54 may be connected to a T-fitting in a water supply pipe 56.

The tank is assembled by placing the O-ring 44 and its associated diaphragm 46 on the shelf 28 of the tank liner 14, and the liner 12 is superposed over the liner 14 so that the wall 36 slides along the outer periphery of the O-ring and into sliding engagement with the outer periphery of the ribs 30 until the faces 16 and 18 mate in face-to-face apposition. The liners 12 and 14 are secured in this position by taping, or the like, and the liner surface is wound with a resin-impregnated filament.

Referring now to FIGS. 3–6, the assembled liners 12 and 14 serve as a winding mandrel for a load carrying filament winding 60 which progresses in a polar winding pattern about polar openings 62 at a wind angle of α.

The liners 12 and 14 define upper and lower domed geodesic surfaces 64 and 66 meeting at a line defining the diameter of the pressure vessel.

The filament winding 60 comprises winding bands of glass, an aramid, carbon filaments, or the like. The winding is conducted in accordance with known polar winding techniques.

Figure 4:
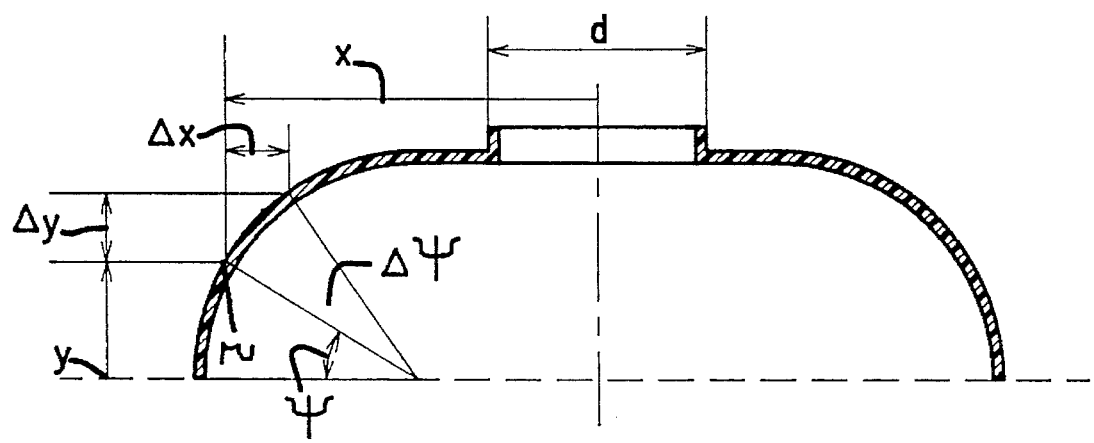
FIG. 4 is a cross-sectional illustration of a dome portion of the liner illustrated in FIG. 3.

Referring now to FIG. 4, there is illustrated a geodesic dome profile where no bending loads are permitted in the winding filaments. Such a shape is commonly designated as an isotensoid shape. It is common knowledge that if a length of the fiber is in moment equilibrium about the axis of the vessel, the local wind angel $\Theta$ at a radial location r is given by:

$$\Theta = \sin^{-1}\left(\frac{(d/2)}{x}\right) \quad (1)$$

where $\Theta$ = the local filament wind angle;

D = the vessel diameter; and d = the polar diameter.

When x is=to the radius of the vessel, or D/2, then $\Theta = \sin^{-1}(d/D)$

The forces on a dome element at an angle $\psi$, which is the angle defined by the meridia at a radial location x on the surface traced by the meridia are given by:

$$N_m = \left(\frac{x}{\cos\psi}\right)(P/2) \quad (2)$$

where P=internal gauge pressure and $$N_h = \left(\frac{x}{\cos\psi}\right)\left(P - \frac{N_m}{r}\right) \quad (3)$$

where

Nm=force per unit length in the meridial direction;

Nh=force per unit length in the hoop direction; and r=the radius of curvature of the meridia.

For a filament wound dome:

$$\frac{N_h}{N_m} = \tan^2\Theta \quad (4)$$

solving for r in equation (3) by substituting equation (2) and (4) yields $$r = \frac{x}{\cos\psi(2 - \tan^2\Theta)} \quad (5)$$

Figure 3:
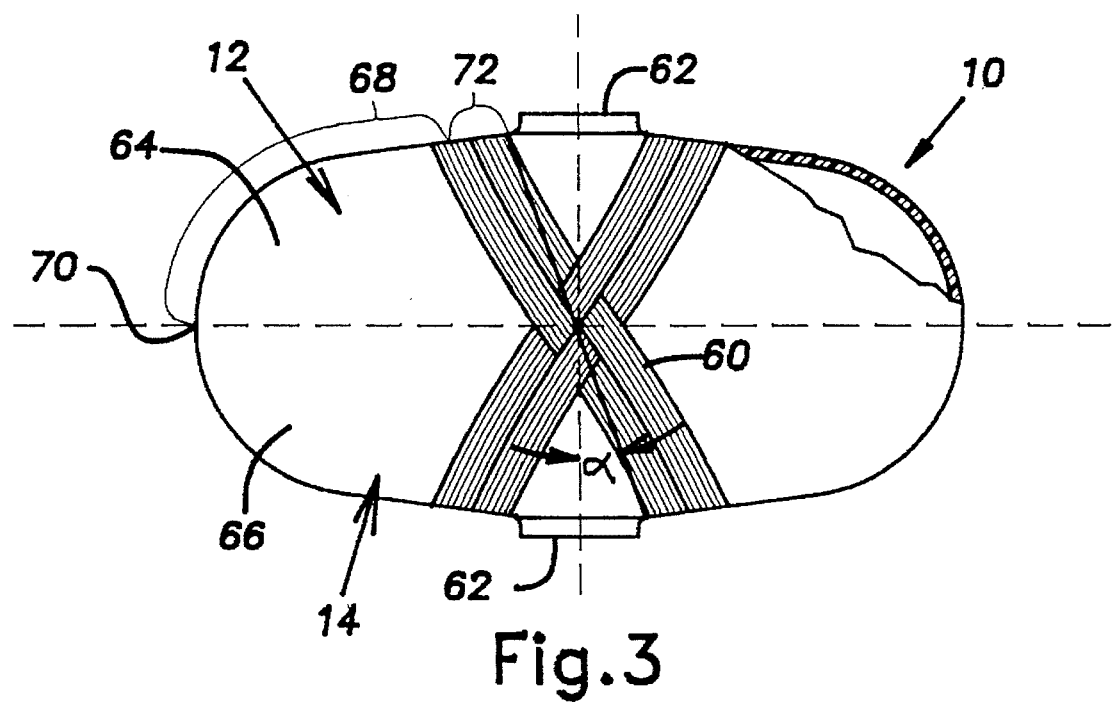
FIG. 3 is an elevational view of a pressure vessel liner having geodesic dome surfaces and illustrating the liner partially wound with an isotensoid filament.

Equation (5) defines the equilibrium dome contour for a first curved surface portion 68, as indicated by the brackets in FIG. 3.

Starting at the diameter of the geodesic surfaces 64 and 66, or position 70 in FIG. 3, ψ=0 and x=D/2, angle ψ is incremented by an amount Δψ. At the first increment, ψ=0+Δψ=Δψ. From this relationship, r can be determined from equation (5).
Also, $$\Delta x = r\Delta\psi \sin\psi$$

$$\Delta y = r\Delta\psi \cos\psi.$$

In general, $$\psi X = \psi + \Delta\psi$$

$$x = D/2 - \Sigma\Delta x$$

$$y = \Sigma\Delta y$$

The solution proceeds step-by-step to produce a number of points constituting the curve until $\tan^2\Theta=2$. At this point, r=1.22 (d/2). It should be noticed that r, as expressed in equation (5), becomes undefined. That is to say, r approaches infinity when the curve reaches a point of inflection, and further movement along the curve toward the polar opening requires that the surface reverse its concavity.

Figure 5:
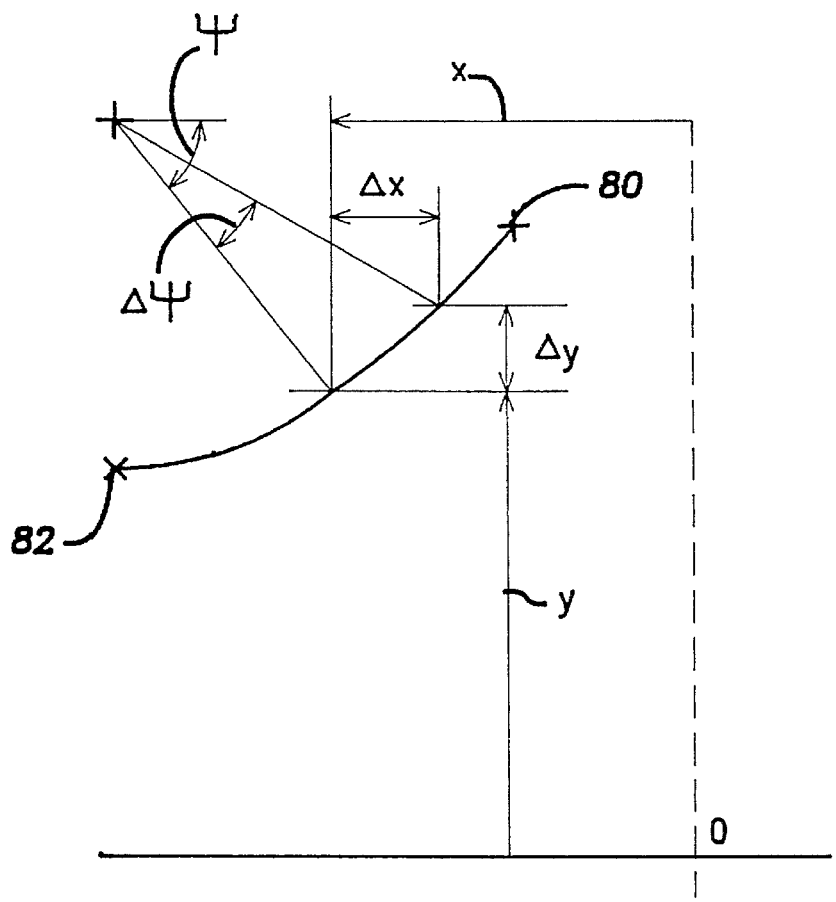
FIG. 5 is an illustration of a liner surface which comprises a reversely curved portion of the geodesic dome adjacent the polar opening.

In order to determine the curvature of that second surface portion of the dome indicated by the bracket 72 in FIG. 3, reference may be made to FIG. 5 which illustrates a second surface portion in an exaggerated curve with the plotting of that curve progressing from the polar opening 80 to the point of inflection 82. As may be noted from FIG. 5, the progression is identical to the progression described in connection with FIG. 4, except that the radius is reversed to provide the reversed curvature past the point of inflection. In general, according to FIG. 5, ψ=ψ–Δψ.

With respect to the second surface portion 72, as r approaches 1.22(d/2), r becomes larger and larger. Consequently, the arc described by r approaches a straight line. It is, therefor, reasonable to connect the curves of portions 68 and 72 with a short straight line 74, as shown in FIG. 6.

Figure 6:
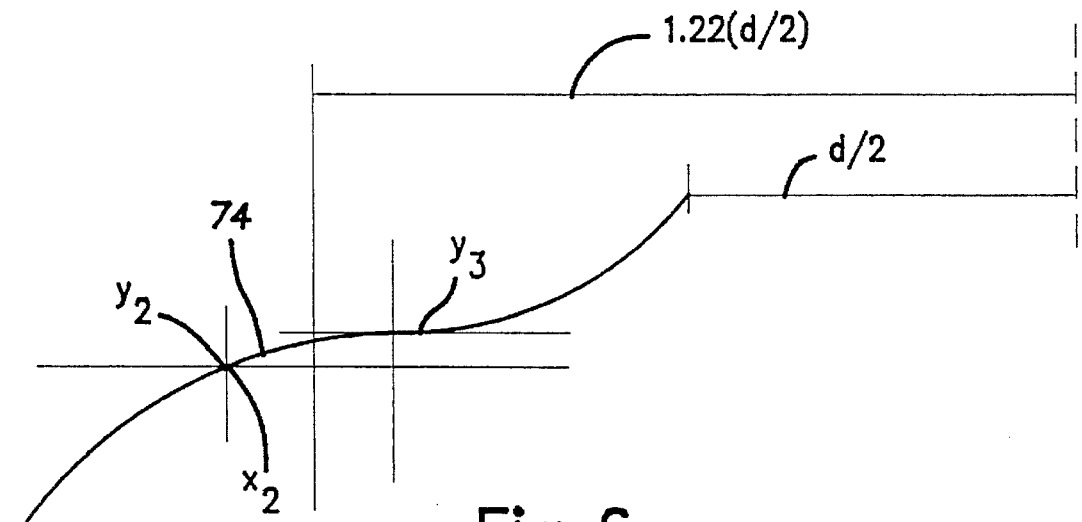
FIG. 6 is a representation of the geodesic surface of the tank liner from the diameter of the liner to the polar opening.

Referring now to FIG. 6, there is illustrated the first and second portions of reverse curvature 68 and 72, respectively, joined by the short straight line 74. It should be appreciated that the line 74 has been greatly exaggerated for purposes of clarity. As is illustrated in FIG. 6, the curves 72 and 68 are joined by the very short, straight line 74 which generates a surface in accordance with the following formula:

$$Y_3 = y_2 + m(x_2 - 1.22(d/2))$$

where $Y_2$ is a first point on the surface traced by the meridia and measured on the polar axis with the location of the first point being just unto, but not at, the inflection point $x_2$=the first point on the surface traced by the meridia but measured on the diameter of the mandrel $y_3$=a second point on the surface traced by the meridia and measured on the polar axis at a location just unto, but not at, the inflection point m=the slope of the line, and d=the diameter of the polar opening.

The provision of the very short, straight line 74 enables the curved surface portions 68 and 72 to be joined. X and y axis numerical values may then be calculated from a given tank diameter and a given polar opening diameter. These values may then be programmed into a numerically controlled mold cutting machine according to prior art practices to produce a mold having the described curvature.

Although the preferred embodiments of this invention have been shown and described, it should be understood that various modifications and rearrangements of the parts may be resorted to without departing from the scope of the invention as disclosed and claimed herein.

What is claimed is:

1. A filament-wound pressure vessel having a seal and diaphragm assembly comprising first and second cup-shaped plastic tank liners having circular open mouth end portions having first and second end faces, respectively, which mate in face-to-face apposition to form an outer surface, said outer surface being at least in part defined by domes, each having a curved surface of revolution generated by first and second lines of identically reversed curvature, each of said domes extending between a circumference having a diameter corresponding to a first axis of said vessel and between a second transverse polar axis of said vessel, said first and second end faces meeting to form inner and outer circular seam lines and to define an interior chamber, said second tank liner having an inner axially-extending cylindrical wall spaced radially inwardly from said inner seam line, said cylindrical wall having an annular shelf extending radially outwardly to an inner wall portion of said first tank liner, said inner wall portion of said second tank liner being cylindrical and having an annular ledge extending radially inwardly, an O-ring positioned between said shelf and said ledge and being compressed between said cylindrical wall and said inner wall portion of said second tank liner, said O-ring forming the periphery of an integral flexible diaphragm, said diaphragm extending between an end of said cylindrical wall and an edge of said ledge to separate said interior into discrete variable volume pressure chambers, and a resin-impregnated filament winding covering said outer surface in a predetermined winding pattern.

2. A filament-wound pressure vessel according to claim 1, wherein said outer surface is entirely defined by said domes.

3. A pressure vessel according to claim 1, wherein said first and second end faces are conical.

4. A pressure vessel according to claim 3, wherein said end faces are conical and mate in face-to-face apposition at a location which is offset from said circumference.

5. A pressure vessel according to claim 4, wherein said annular shelf is formed by a second multiplicity of radial fins.

6. A hydropneumatic filament-wound pressure vessel according to claim 5, wherein said outer surface includes geodesic end surfaces providing isotensoid loading of the filament, each end surface extending between a circumference of said pressure vessel and a polar opening and being defined by first and second oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point.

7. A hydropneumatic filament-wound pressure vessel according to claim 5, wherein said outer surface includes geodesic end surfaces providing isotensoid loading of the filament, each end surface extending between a diameter of said liner and a polar opening and being defined by oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point:

$$r = \frac{x}{\cos\Psi(2 - \tan^2\theta)}$$

where
- r=a radius of curvature of the meridia,
- x=a radial location on the surface traced by the meridia,
- ψ=an angle defined by the meridia at x with the diameter of the mandrel,
- θ=a wind angle of the cylinder, said first and second surfaces being joined and said inflection point being traversed by a straight line third surface of revolution closely approximating geodesic curvature through the inflection point, said third surface being in accordance with the formula:

$$y_3 = y_2 + m\left[x_2 - 1.22\left(\frac{d}{2}\right)\right]$$

where
- $Y_3$=the said second point on the surface traced by the meridia and measured on a polar axis,
- $Y_2$=the said first point on the surface traced by the meridia and measured on the polar axis,
- $x_2$=the said first point on the surface traced by the meridia and measured on the diameter of the mandrel,
- m=the slope of the line, and
- d=the diameter of the polar opening.

8. A pressure vessel according to claim 7, wherein said first and second end faces are conical.

9. A pressure vessel according to claim 8, wherein said end faces are conical and mate in face-to-face apposition at a location which is offset from said circumference.

10. A pressure vessel according to claim 9, wherein said annular shelf is formed by a second multiplicity of radial fins.

11. A pressure vessel according to claim 7, wherein said first axis bisects said O-ring.

12. A pressure vessel according to claim 7, wherein said ledge is defined by a first multiplicity of radial fins.

13. A pressure vessel according to claim 1, wherein said first axis bisects said O-ring.

14. A pressure vessel according to claim 1, wherein said ledge is defined by a first multiplicity of radial fins.

15. A hydropneumatic filament-wound pressure vessel according to claim 1, wherein said outer surface provides a surface which insures isotensoid loading of the filament, each said dome extending between a circumference of said pressure vessel and a polar opening and being defined by first and second oppositely curving surfaces of revolution of a meridia joined by an inflection point, said first surface of revolution curving from said diameter to a first point just unto but not at said inflection point, said second surface of revolution curving from said polar opening to a second point just unto but not at said inflection point in a direction opposite the curvature of said first surface of revolution, said first and second surfaces being joined and said inflection point being traversed by a straight line third surface of revolution closely approximating geodesic curvature through the inflection point.

16. A hydropneumatic filament-wound pressure vessel having a seal assembly comprising first and second cup-shaped plastic tank liners having circular open mouth end portions having first and second end faces, respectively, which mate in face-to-face apposition to form an outer surface and inner and outer circular seam lines, said second tank liner having an integral inner axially-extending cylindrical wall, said cylindrical wall having an annular shelf radially extending to an inner surface of said first tank liner and at a level which is axially offset from said inner seam line, said inner surface of said first tank liner having an integral annular ledge axially spaced from said annular shelf, said annular shelf, said annular ledge, said cylindrical wall and said inner surface of said first tank liner cooperating to define an O-ring pocket, an O-ring in said pocket, and a resin-impregnated filament winding covering said outer surface in a predetermined winding pattern.

* * * * *